(12) United States Patent
Wamprecht et al.

(10) Patent No.: US 7,985,479 B2
(45) Date of Patent: Jul. 26, 2011

(54) POLYISOCYANATE MIXTURES, PROCESSES FOR PREPARING THE SAME AND USES THEREFOR

(75) Inventors: Christian Wamprecht, Neuss (DE); Christos Karafilidis, Düsseldorf (DE); Peter Reichert, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 610 days.

(21) Appl. No.: 12/143,283

(22) Filed: Jun. 20, 2008

(65) Prior Publication Data
US 2008/0318060 A1 Dec. 25, 2008

(30) Foreign Application Priority Data

Jun. 22, 2007 (DE) .................. 10 2007 028 922

(51) Int. Cl.
*B32B 27/40* (2006.01)
*C08G 18/76* (2006.01)
*B35C 5/00* (2006.01)

(52) U.S. Cl. ............... 428/423.1; 525/452; 427/445
(58) Field of Classification Search ............ 525/452; 427/445; 428/423.1
See application file for complete search history.

(56) References Cited

U.S. PATENT DOCUMENTS

| | | | |
|---|---|---|---|
| 3,792,023 A | 2/1974 | Havenith et al. | |
| 4,258,140 A | 3/1981 | Horacek et al. | |
| 5,204,439 A * | 4/1993 | Dormish et al. | 528/44 |
| 5,530,154 A | 6/1996 | Seifert et al. | |
| 5,925,724 A | 7/1999 | Cenens et al. | |
| 6,248,695 B1 | 6/2001 | Griffiths et al. | |
| 6,627,699 B2 | 9/2003 | Sawitski, Jr. et al. | |
| 6,908,979 B2 * | 6/2005 | Arendoski | 528/49 |
| 7,199,207 B2 | 4/2007 | Gruenewaelder et al. | |
| 7,253,244 B2 | 8/2007 | Gruenewaelder et al. | |

FOREIGN PATENT DOCUMENTS

| | | |
|---|---|---|
| CA | 2200144 | 9/1997 |
| DE | 1922626 | 11/1970 |
| DE | 4417938 A1 | 11/1995 |
| DE | 10237649 A1 | 2/2003 |
| DE | 10304153 A1 | 11/2003 |
| EP | 0002768 A2 | 7/1979 |
| EP | 0276927 | 8/1988 |
| EP | 0796880 | 9/1997 |
| EP | 1072620 A2 | 1/2001 |
| EP | 1072621 A2 | 1/2001 |
| EP | 1471088 A2 | 10/2004 |
| WO | WO-95/10555 A1 | 4/1995 |
| WO | WO-00/44803 | 8/2000 |
| WO | WO-01/23478 | 4/2001 |
| WO | WO-03/066700 A1 | 8/2003 |

* cited by examiner

*Primary Examiner* — Thao T. Tran
(74) *Attorney, Agent, or Firm* — Connolly Bove Lodge & Hutz LLP

(57) ABSTRACT

Polyisocyanate mixtures, their preparation by reacting aromatic polyisocyanate mixtures and nitrogen-containing polyetherol mixtures, and their use as an isocyanate component for the preparation of moisture-curing adhesives, said polyisocyanate mixtures comprising: (A) 15 to 35 wt. % of diphenylmethane diisocyanate with 2 aromatic rings; (3) 10 to 30 wt. % of polymeric diphenylmethane diisocyanate with 3 or more aromatic rings; and (C) 40 to 75 wt. % of an isocyanate-functional polyurethane; wherein the polyisocyanate mixture has an isocyanate content of 12 to 20 wt. %, an isocyanate functionality of >2.4, a viscosity of <10,000 mPa·s at 25° C., and a shear rate of 80 1/s.

8 Claims, No Drawings

POLYISOCYANATE MIXTURES, PROCESSES FOR PREPARING THE SAME AND USES THEREFOR

BACKGROUND OF THE INVENTION

Moisture-curing adhesives and their preparation belong to the general state of the art and are frequently described in the literature. All isocyanate group-containing prepolymers that are not stored in an absolutely moisture-tight container lose isocyanate groups over time due to reaction with atmospheric moisture. Temperature stress markedly promotes this process. This reaction proceeds rapidly on the surface; diffusion into the interior of e.g. mouldings, foams or layers of adhesives and sealants can take long periods of time. As long as this reaction takes place, the molecular weight or crosslinking density increases and the physical properties change accordingly.

Especially in the adhesives sector, it is desirable for the reaction of the free isocyanate groups of the prepolymer with atmospheric moisture to be as rapid and as complete as possible so that the ultimate use properties are obtained early. Nevertheless, the prepolymer must have a very good storage stability. To accelerate the curing process, external catalysts are often added to the formulations, examples being organic tin compounds (dibutyltin dilaurate) or aminic accelerators (dimorpholinodiethyl ether). However, these catalysts can have an adverse effect on the storage stability under temperature stress of, in particular, prepolymers based on reactive aromatic isocyanates, and on the property profile of the adhesive. There has therefore been no lack of attempts to provide highly reactive isocyanate-containing prepolymers that have a high reactivity to moisture without the addition of external catalysts. Such prepolymers are frequently based on polyetherpolyols or polyesterpolyols containing nitrogen atoms. These products are preferably used in one-component, moisture-curing foam applications.

EP-A 0 002 768 describes, e.g., one-component foams in which isocyanate group-containing prepolymers are present as starting materials. These prepolymers are obtained by reacting a polyol mixture, consisting of 90-100 wt. % of an amino-polyetheralcohol and/or polyesteralcohol, with organic polyisocyanates and other additives, e.g. propellants, in pressurized containers, e.g. aerosol cans. On expansion to atmospheric pressure, e.g., with the aid of a valve, the mixture foams and rapidly cures under the influence of atmospheric moisture to give a dimensionally stable closed-cell polyurethane foam. However, such products are not suitable for the formulation of moisture-curing adhesives.

DE-A 4 417 938 describes isocyanate group-containing prepolymers prepared from organic polyisocyanates and polyols, part of these polyols being based on aromatic aminopolyetherpolyols. In particular, such prepolymers exhibit a reduced tendency to crystallize and are suitable for the production of cellular or compact polyurethane plastics. Such products are not suitable for the preparation of adhesives.

EP 1 471 088 A describes PUR formulations based on polyisocyanates and polyetherpolyols with at least one aromatic and/or aliphatic starter containing $NH_2$ or NHR groups, which, when the polyol component is mixed with the polyisocyanates, immediately or very rapidly produce a good compatibility, so the stirring time can be shortened in comparison with systems of the state of the art. This good compatibility is particularly desirable for the production of PUR casting resins and casting compounds for mouldings which are produced by curing in a mould prepared with release agent.

DE-A 1 922 626 describes a process for the preparation of polyurethane-based one-component systems that are stable on storage and dry rapidly on exposure to atmospheric moisture. The polyurethane isocyanates based on amine-initiated polyethers which can be obtained by this process according to the disclosures and Examples are prepared in substantial amounts of suitable lacquer solvents (60 wt. % of solvent, 40 wt. % of polymer), such as esters, ketones or chlorohydrocarbons, and can be used as binders in one-component coating systems. Suitable solvent-free, low-viscosity one-component adhesives cannot be prepared by this process.

WO 95/10555 describes moisture-curing adhesive compositions consisting of the reaction product of a polyisocyanate and an isocyanate-reactive component containing at least one aliphatic amine-initiated polyol with an ethylene oxide content of at least 1%. Isocyanate-containing prepolymers based on polyethers containing ethylene oxide units have a particularly high affinity for moisture. This can lead to increased blistering while the adhesives are curing. This blistering is disadvantageous for the adhesive bond.

DE-A 10 237 649 describes a one-component polyurethane adhesive containing at least one polyisocyanate prepolymer and at least one aminopolyetherpolyol, the molar ratio of ether groups to amine nitrogen in the aminoetherpolyol being 7 to 30. The proportion of aminopolyetherpolyols in the adhesive according to the invention is very low at only 0.2 to 4.0 wt. %. Even this low proportion, under dimorpholinodiethyl ether catalysis, brings about a halving of the compression time when glueing beechwood. However, this small amount of aminopolyether already has a marked adverse effect on the open assembly time (i.e. processing time).

DE-A 10 304 153 describes a polyurethane prepolymer whose synthetic components are a mixture of polyisocyanates with symmetrical and asymmetrical isocyanate groups, and a mixture of polyethers with functionalities of <2.5 and >2.5, the proportion of polyisocyanates with symmetrical isocyanate groups being greater than the proportion of polyisocyanates with asymmetrical isocyanate groups. The inventive merit of this patent application is said to consist in the fact that the claimed prepolymers are particularly light in colour. This fact is highly dubious since the colour quality of prepolymers depends neither on the isomer composition of polyisocyanates nor on the functionality of polyol components. This fact was taken into account in the granting of the corresponding European patent EP-B 1 490 418, where at least the molecular weights of the polyether components were greatly restricted.

EP-A 1 072 620 describes a solvent-poor adhesive composition consisting of up to 99-999 wt. % of an isocyanate group-containing prepolymer, 0 to 20 wt. % of additives and auxiliary substances and 0.001 to 10 wt. % of at least one morpholine derivative as activator. The compositions described are chosen within very wide limits, so no specific property characteristics of the resulting adhesive compositions are given. Furthermore, a morpholine derivative is necessary, which has a restrictive effect, can have a negative influence on the storage stability and can create compatibility problems.

EP-A 1 072 621 describes fibre-containing adhesive compositions based on the adhesive composition according to EP-A 1 072 620 and 0.1 to 20 wt. % of a filler containing at least one fibre, the difference being that a fibre-containing filler is necessary rather than a morpholine derivative.

BRIEF SUMMARY OF THE INVENTION

The invention relates to polyisocyanate mixtures, to their preparation by reacting aromatic polyisocyanate mixtures with nitrogen-containing polyetherol mixtures, and to their use as an isocyanate component for the preparation of moisture-curing adhesives.

The present invention provides polyisocyanate mixtures for adhesive applications which do not exhibit the disadvantages of the state of the art. The present invention preferably provides polyisocyanate mixtures for adhesive applications which have a low viscosity, an improved storage stability and, without the addition of a separate activator, a rapid dry-hard time and the shortest possible set-to-touch time, a high initial strength after a short bonding time, and a high ultimate strength after the shortest possible curing time.

One embodiment of the present invention includes polyisocyanate mixtures which comprise:

(A) 15 to 35 wt. % of diphenylmethane diisocyanate with 2 aromatic rings;

(B) 10 to 30 wt. % of polymeric diphenylmethane diisocyanate with 3 or more aromatic rings; and (C) 40 to 75 wt. % of an isocyanate-functional polyurethane component;

wherein the polyisocyanate mixture has an isocyanate content of 12 to 20 wt. %, an isocyanate functionality of >2.4, a viscosity of <10,000 mPa·s at 25° C., and a shear rate of 80 1/s, and wherein the isocyanate-functional polyurethane component comprises a mixture of prepolymers prepared by reacting:

(i) a first mixture comprising:

(a) at least one first aromatic polyisocyanate reactant mixture comprising diphenylmethane diisocyanate and having >38% of its isocyanate groups in the 4,4' position and having 0 to 60% of its isocyanate groups in the 2,4' position and 0 to 2% of its isocyanate groups in the 2,2'-position, an isocyanate content of >33 wt. % and a functionality of 2.0; and (b) at least one second aromatic polyisocyanate reactant mixture comprising diphenylmethane diisocyanate and having <50% of its isocyanate groups in the 4,4' position, 10 to 15% of its isocyanate groups in the 2,4' position, and 0.1 to 5% of its isocyanate groups in the 2,2' position, an isocyanate content of 30 to 33 wt. % and a functionality of >2.0;

with (ii) a second mixture comprising:

(c) at least one amino group-free polyether based on propylene oxide having an OH number of 40 to 80 mg KOH/g and a functionality of at least 2.0; and (d) at least one amino group-containing polyether based on propylene oxide having an OH number of 40 to 80 mg KOH/g, a functionality of 4.0 and an amine content of 0.499 to 0.998 wt. %.

Various embodiments of the present invention also include polyisocyanate mixtures which consist of:

(A) 15 to 35 wt. % of diphenylmethane diisocyanate with 2 aromatic rings, (B) 10 to 30 wt. % of polymeric diphenylmethane diisocyanate with 3 or more aromatic rings, and (C) 40 to 75 wt. % of an isocyanate-functional polyurethane component;

wherein the polyisocyanate mixture has an isocyanate content of 12 to 20 wt. %, an isocyanate functionality of >2.4, a viscosity of <10,000 mPa·s at 25° C., and a shear rate of 80 1/s, and wherein the isocyanate-functional polyurethane component comprises a mixture of prepolymers prepared by reacting:

(i) a first mixture comprising:

(a) at least one first aromatic polyisocyanate reactant mixture comprising diphenylmethane diisocyanate and having >38% of its isocyanate groups in the 4,4' position and having 0 to 60% of its isocyanate groups in the 2,4' position and 0 to 2% of its isocyanate groups in the 2,2'-position, an isocyanate content of >33 wt. % and a functionality of 2.0; and (b) at least one second aromatic polyisocyanate reactant mixture comprising diphenylmethane diisocyanate and having <50% of its isocyanate groups in the 4,4' position, 10 to 15% of its isocyanate groups in the 2,4' position, and 0.1 to 5% of its isocyanate groups in the 2,2' position, an isocyanate content of 30 to 33 wt. % and a functionality of >2.0;

with (ii) a second mixture comprising:

(c) at least one amino group-free polyether based on propylene oxide having an OH number of 40 to 80 mg KOH/g and a functionality of at least 2.0; and (d) at least one amino group-containing polyether based on propylene oxide having an OH number of 40 to 80 mg KOH/g, a functionality of 4.0 and an amine content of 0.499 to 0.998 wt. %.

The invention also provides a process for the preparation of the prepolymers (i.e., polyisocyanate mixtures according to the aforementioned various embodiments of the invention) by reacting special aromatic polyisocyanate mixtures with special nitrogen-containing polyetherol mixtures, and their use as an isocyanate component in moisture-curing adhesives.

DETAILED DESCRIPTION OF THE INVENTION

As used herein, the singular terms "a" and "the" are synonymous and used interchangeably with "one or more" and "at least one," unless the language and/or context clearly indicates otherwise. Accordingly, for example, reference to "a mixture" herein or in the appended claims can refer to a single mixture or more than one mixture. Additionally, all numerical values, unless otherwise specifically noted, are understood to be modified by the word "about."

The viscosity of the polyisocyanate mixtures according to the various embodiments of the present invention at 25° C. and a shear rate of 80 1/s are generally <10,000 mPa·s, preferably <9000 mPa·s, more preferably <8000 mPa·s and most preferably <7000 mPa·s.

The isocyanate content of the polyisocyanate mixtures according to the various embodiments of the present invention can be 12 to 20 wt. %, preferably 13 to 19 wt. % and more preferably from 14 to 18 wt. %.

The average isocyanate functionality of the polyisocyanate mixtures according to the various embodiments of the present invention is >2.20, preferably >2.40 and more preferably >2.60.

In the preparation of the polyisocyanate mixtures according to the various embodiments of the present invention, polyisocyanate reactant mixtures (a) and (b) can be placed in a reaction vessel and polyol components (c) and (d) are metered in at temperatures ranging from 40 to 80° C., either as a mixture or in succession. Components (a) to (d) are preferably used in proportions such that the previously described properties of the polyisocyanate mixture are obtained, especially the viscosity, the isocyanate content and the functionality.

Polyisocyanate reactant mixture (a) comprises at least one aromatic polyisocyanate mixture based on diphenylmethane diisocyanate having at least >38% of isocyanate groups in the 4,4' position, 0 to 60.0% in the 2,4' position and 0 to 2 in the 2,2'-position, and a functionality of 2.0. The isocyanate content is >33.0 wt. %, preferably >33.2 wt. %, particularly preferably >33.4 wt. % and very particularly preferably >33.5 wt. %.

Polyisocyanate reactant mixture (b) comprises at least one polyisocyanate mixture based on diphenylmethane diisocyanate having a proportion of 4,4' isomer of <50%, preferably of <48%, particularly preferably of <46% and very particularly preferably of <44%, a proportion of 2,4' isomer ranging from 10 to 15%, particularly preferably from 11 to 14% and very particularly preferably from 11.5 to 13.5%, a proportion of 2,2' isomer ranging from 0.1 to 5%, preferably from 1 to 4% and particularly preferably from 1.5 to 3.5%, an isocyanate content of between 30 and 33 wt. %, particularly preferably of between 31 and 32 wt. %, and a functionality of >2.0, preferably of >2.2, particularly preferably of >2.4 and very particularly preferably of >2.5.

Polyol component (c) comprises at least one amino group-free polyether based on propylene oxide having an OH number ranging from 40 to 80 mg KOH/g, preferably from 45 to 75 and particularly preferably from 50 to 70, and a functionality of at least 2.0, preferably of 2.0 to 4.0, particularly preferably of 2.0 to 3.0 and very particularly preferably of 2.0 to 2.5. Examples of suitable starter molecules for polyol component (c) are polyols such as ethylene glycol, propylene glycol or 1,4-butanediol, polyols such as glycerol, trimethylolpropane or pentaerythritol, and water.

Polyol component (d) comprises at least one amino group-containing polyether based on propylene oxide having an OH number ranging from 40 to 80 mg KOH/g, preferably from 45 to 75 and particularly preferably from 50 to 70, a functionality of 4.0 and an amine content ranging from 0.50 to 1.00, preferably from 0.56 to 0.94 and particularly preferably from 0.62 to 0.88 wt. %. Examples of suitable starter molecules for polyol component (d) are diamines such as ethylenediamine, hexamethylenediamine, isophoronediamine and 4,4'-diaminodicyclohexylmethane.

The polyisocyanate mixtures according to the invention can be suitably prepared by reacting polyisocyanate reactant mixtures (a) and (b) with polyol components (c) and (d). Preferably, the polyisocyanate reactant mixtures are placed in a reaction vessel under an inert gas atmosphere and the polyol components are metered in. The reaction temperatures can range from 20 to 120° C., preferably from 30 to 110° C. and particularly preferably from 40 to 100° C. It is advisable to control any exothermicity by cooling so that the reaction between the isocyanate groups of polyisocyanate reactant mixtures (a) and (b) and the hydroxyl groups of polyol components (c) and (d) proceeds at constant temperature. The reaction is complete when the desired isocyanate contents or viscosities of the polyisocyanate mixtures according to the invention are reached.

The polyisocyanate mixtures according to the invention comprise, in some embodiments consist essentially of, and in still other embodiments consist of;
(A) 15 to 35 wt. %, preferably 20 to 35 wt. %, of diphenylmethane diisocyanate with 2 aromatic rings,
(B) 10 to 30 wt. %, preferably 15 to 30 wt. %, of polymeric diphenylmethane diisocyanate with 3 or more aromatic rings, and
(C) 40 to 75 wt. %, preferably 40 to 70 wt. %, of an isocyanate-functional polyurethane component.

Without other additives, the resulting polyisocyanate mixtures according to the invention are suitable for use as moisture-curing adhesives, preferably in the DIY sector. The polyisocyanate mixtures according to the invention are distinguished by rapid drying at room temperature and very early adhesive capacity, so catalysts and accelerators can be completely dispensed with. For this reason the polyisocyanate mixtures have an extremely good storage stability, even at elevated temperatures of up to 80° C. Furthermore, the viscosity is in a very favorable range for application. The viscosity of the polyisocyanate mixtures according to the invention at 25° C. and a shear rate of 80 1/s is <10,000 mPa·s, preferably <9000 mPa·s, particularly preferably <8000 mPa·s and very particularly preferably <7000 mPa·s. This allows them to be used in different climatic regions. The dry-hard time of the adhesives prepared from the polyisocyanate mixtures according to the invention is between 30 and 75 min, preferably between 35 and 65 min and particularly preferably between 40 and 60 min for a layer thickness of 250 μm and climatic conditions of 23° C. and 50% relative humidity. The set-to-touch time of the adhesives prepared from the polyisocyanate mixtures according to the invention is <100 min, preferably <90 min and particularly preferably <80 min for a layer thickness of 250 μm and climatic conditions of 23° C. and 50% relative humidity.

The invention will now be described in further detail with reference to the following non-limiting examples.

EXAMPLES

Example 1

A mixture of 195 g of a polypropylene oxide polyether based on 1,2-propanediol having an OH number of 56 mg KOH/g, and 666 g of a polypropylene oxide polyether based on 1,2-diaminoethane having an OH number of 60 mg KOH/g, is placed in a 3-liter four-necked flask and stirred for 1 hour at 120° C. under a vacuum of 20 mbar. It is then cooled to 70° C. The polyol mixture obtained is metered over approx. 30 minutes into a mixture of 923 g of a polyisocyanate based on diphenylmethane diisocyanate (MDI) having an NCO content of 31.5 wt. %, a 2,2'-MDI content of 2.3%, a 2,4'-MDI content of 12.6%, a 4,4'-MDI content of 42.4% and a viscosity of 90 mPa·s at 25° C., and 216 g of a polyisocyanate based on MDI having an NCO content of 33.6 wt. %, a 2,4'-MDI content of 1%, a 4,4'-MDI content of 99% and a viscosity of 4 mPa·s (25° C.). The resulting mixture is then heated to 80° C. utilizing any exothermic reaction that may occur. It is stirred at 80° C. until the isocyanate content is constant. The result is a brownish-colored polyisocyanate mixture having an NCO content of 15.9 wt. %, a viscosity of 4971 mPa·s (25° C., shear rate 80 1/s) and an average isocyanate functionality of approx. 2.7 which contains 30.3% of component (A), 25.5% of component (B) and 44.2% of component (C).

Example 2

A mixture of 195 g of a polypropylene oxide polyether based on 1,2-propanediol having an OH number of 56 mg KOH/g, and 666 g of a polypropylene oxide polyether based on 1,2-diaminoethane having an OH number of 60 mg KOH/g, is placed in a 3-liter four-necked flask and stirred for 1 hour at 120° C. under a vacuum of 20 mbar. It is then cooled to 70° C. The polyol mixture obtained is metered over approx. 30 minutes into a mixture of 923 g of a polyisocyanate based on diphenylmethane diisocyanate (MDI) having an NCO content of 31.5 wt. %, a 2,2'-MDI content of 2.3%, a 2,4'-MDI content of 12.6%, a 4,4'-MDI content of 42.4% and a viscosity of 90 mPa·s at 25° C., and 216 g of a polyisocyanate based on MDI having an NCO content of 33.6 wt. %, a 2,4'-MDI content of 56.0 wt. %, a 4,4'-MDI content of 43.4 wt. % and a viscosity of 4 mPa·s (25° C.). The resulting mixture is then heated to 80° C. utilizing any exothermic reaction that may occur. It is stirred at 80° C. until the isocyanate content is constant. The result is a brownish-colored polyisocyanate mixture having an NCO content of 15.9 wt. %, a viscosity of 5870 mPa·s (25° C., shear rate 80 1/s) and an average isocyanate functionality of approx. 2.7.

Example 3

A mixture of 193 g of a polypropylene oxide polyether based on 1,2-propanediol having an OH number of 56 mg KOH/g, and 662 g of a polypropylene oxide polyether based on 1,2-diaminoethane having an OH number of 60 mg KOH/g, is placed in a 3-liter four-necked flask and stirred for 1 hour at 120° C. under a vacuum of 20 mbar. It is then cooled to 70° C. The polyol mixture obtained is metered over approx. 30 minutes into a mixture of 1035 g of a polyisocyanate based on diphenylmethane diisocyanate (MDI) having an NCO content of 31.5 wt. %, a 2,2'-MDI content of 2.3 wt. %, a 2,4'-MDI content of 12.6 wt. %, a 4,4'-MDI content of 42.4 wt. % and a viscosity of 90 mPa·s at 25° C., and 110 g of a polyisocyanate based on MDI having an NCO content of 33.6 wt. %, a 2,4'-MDI content of 1 wt. %, a 4,4'-MDI content of 99 wt. % and a viscosity of 4 mPa·s (25° C.). The resulting mixture is then heated to 80° C. utilizing any exothermic reaction that may occur. It is stirred at 80° C. until the isocyanate content is constant. The result is a brownish-colored polyisocyanate mixture having an NCO content of 16.1 wt. %, a viscosity of 6441 mPa·s (25° C., shear rate 80 l/s) and an average isocyanate functionality of approx. 2.8.

Example 4

A mixture of 193 g of a polypropylene oxide polyether based on 1,2-propanediol having an OH number of 56 mg KOH/g, and 662 g of a polypropylene oxide polyether based on 1,2-diaminoethane having an OH number of 60 mg KOH/g, is placed in a 3-liter four-necked flask and stirred for 1 hour at 120° C. under a vacuum of 20 mbar. It is then cooled to 70° C. The polyol mixture obtained is metered over approx. 30 minutes into a mixture of 1035 g of a polyisocyanate based on diphenylmethane diisocyanate (MDI) having an NCO content of 31.5 wt. %, a 2,2'-MDI content of 2.3 wt. %, a 2,4'-MDI content of 12.6 wt. %, a 4,4'-MDI content of 42.4 wt. % and a viscosity of 90 mPa·s at 25° C., and 110 g of a polyisocyanate based on MDI having an NCO content of 33.6 wt. %, a 2,4'-MDI content of 56.0%, a 4,4'-MDI content of 43.4 wt. % and a viscosity of 4 mPa·s (25° C.). The resulting mixture is then heated to 80° C. utilizing any exothermic reaction that may occur. It is stirred at 80° C. until the isocyanate content is constant. The result is a brownish-colored polyisocyanate mixture having an NCO content of 16.3 wt. %, a viscosity of 6507 mPa·s (25° C., shear rate 80 l/s) and an average isocyanate functionality of approx. 2.8.

The following Examples are now given as Comparative Examples not according to the invention:

Example 5

Comparative

A mixture of 430 g of a polypropylene oxide polyether based on 1,2-propanediol having an OH number of 56 mg KOH/g, and 430 g of a polypropylene oxide polyether based on 1,2-diaminoethane having an OH number of 60 mg KOH/g, is placed in a 3-liter four-necked flask and stirred for 1 hour at 120° C. under a vacuum of 20 mbar. It is then cooled to 70° C. The polyol mixture obtained is metered over approx. 30 minutes into 1140 g of a polyisocyanate based on diphenylmethane diisocyanate (MDI) having an NCO content of 31.5 wt. %, a 2,2'-MDI content of 2.3 wt. %, a 2,4'-MDI content of 12.6 wt. %, a 4,4'-MDI content of 42.4 wt. % and a viscosity of 90 mPa·s at 25° C. The resulting mixture is then heated to 80° C. utilizing any exothermic reaction that may occur. It is stirred at 80° C. until the isocyanate content is constant. The result is a brownish-colored polyisocyanate mixture having an NCO content of 16.3 wt. %, a viscosity of 5400 mPa·s (25° C., shear rate 80 l/s) and an average isocyanate functionality of approx. 2.8.

Example 6

Comparative 824 g of a polypropylene oxide polyether based on 1,2-diaminoethane having an OH number of 60 mg KOH/g are placed in a 3-liter four-necked flask and stirred for 1 hour at 120° C. under a vacuum of 20 mbar. It is then cooled to 70° C. The polyol mixture obtained is metered over approx. 30 minutes into 1176 g of a polyisocyanate based on diphenylmethane diisocyanate (MDI) having an NCO content of 31.5 wt. %, a 2,2'-MDI content of 2.3 wt. %, a 2,4'-MDI content of 12.6 wt. %, a 4,4'-MDI content of 42.4 wt. % and a viscosity of 90 mPa·s at 25° C. The resulting mixture is then heated to 80° C. utilizing any exothermic reaction that may occur. It is stirred at 80° C. until the isocyanate content is constant. The result is a brownish-colored polyisocyanate mixture having an NCO content of 16.3 wt. %, a viscosity of 10,200 mPa·s (25° C., shear rate 80 l/s) and an average isocyanate functionality of approx. 2.9.

Testing for Application Technology:

To compare the reactivity, the dry-hard time (DHT) and set-to-touch time (STT) according to ASTM D 5895 were measured in a linear drying recorder and the viscosity was measured at 25° C. and a shear rate of 80 l/s (rotating-cylinder viscometer, DIN 53019). The storage stability at 70° C. was also measured in the form of the viscosity increase over time. The polyisocyanate mixture is considered to be stable on storage when the viscosity has less than doubled after storage for 14 days at 70° C.

| Example no. | Viscosity [mPa · s] (25° C., shear rate 80 l/s) | DHT [min] | STT [min] | Stable on storage after 14 d at 70° C. | According to the invention |
|---|---|---|---|---|---|
| 1 | 4970 | 44 | 70 | Yes | Yes |
| 2 | 5870 | 48 | 74 | Yes | Yes |
| 3 | 6440 | 51 | 74 | Yes | Yes |
| 4 | 6500 | 55 | 73 | Yes | Yes |
| 5 | 5690 | 56 | 106 | Yes | No |
| 6 | 10,200 | 27 | 52 | No | No |

The polyisocyanate mixtures of Examples 1 to 4 according to the invention have a low viscosity of <7000 mPa·s at 25° C. and a shear rate of 80 l/s, a good storage stability and a high reactivity that is reflected in short dry-hard and set-to-touch times. The polyisocyanate mixture of Example 5 likewise has a low viscosity and a good storage stability, but the set-to-touch time is markedly longer than in the case of the polyisocyanate mixtures according to the invention. The polyisocyanate mixture of Example 6 offers very short dry-hard and set-to-touch times, but the viscosity is very high and there is no storage stability.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A polyisocyanate mixture comprising:
   (A) 15 to 35 wt. % of diphenylmethane diisocyanate with 2 aromatic rings;
   (B) 10 to 30 wt. % of polymeric diphenylmethane diisocyanate with 3 or more aromatic rings; and
   (C) 40 to 75 wt. % of an isocyanate-functional polyurethane component;

wherein the polyisocyanate mixture has an isocyanate content of 12 to 20 wt. %, an isocyanate functionality of >2.4, a viscosity of <10,000 mPa·s at 25° C., and a shear rate of 80 l/s, and wherein the isocyanate-functional polyurethane component comprises a mixture of prepolymers prepared by reacting:

(i) a first mixture comprising:
      (a) at least one first aromatic polyisocyanate reactant mixture comprising diphenylmethane diisocyanate and having >38% of its isocyanate groups in the 4,4' position and having 0 to 60% of its isocyanate groups in the 2,4' position, 0 to 2% of its isocyanate groups in the 2,2'-position, an isocyanate content of >33 wt. % and a functionality of 2.0; and
      (b) at least one second aromatic polyisocyanate reactant mixture comprising diphenylmethane diisocyanate and having <50% of its isocyanate groups in the 4,4' position, 10 to 15% of its isocyanate groups in the 2,4' position, and 0.1 to 5% of its isocyanate groups in the 2,2' position, an isocyanate content of 30 to 33 wt. % and a functionality of >2.0;

with (ii) a second mixture comprising:
      (c) at least one amino group-free polyether based on propylene oxide having an OH number of 40 to 80 mg KOH/g and a functionality of at least 2.0; and
      (d) at least one amino group-containing polyether based on propylene oxide having an OH number of 40 to 80 mg KOH/g, a functionality of 4.0 and an amine content of 0.499 to 0.998 wt. %.

2. The polyisocyanate mixture according to claim 1, wherein the polyisocyanate mixture has an isocyanate content of 13 to 19 wt. %, an isocyanate functionality of >2.4, a viscosity of <9,000 mPa·s at 25° C., and a shear rate of 80 l/s.

3. The polyisocyanate mixture according to claim 1, wherein the polyisocyanate mixture has an isocyanate content of 14 to 18 wt. %, an isocyanate functionality of >2.6, a viscosity of <7,000 mPa·s at 25° C., and a shear rate of 80 l/s.

4. An adhesive formulation comprising the polyisocyanate mixture according to claim 1.

5. The adhesive formulation according to claim 4, wherein the formulation comprises a moisture-curing adhesive.

6. An article comprising a substrate having a coating disposed on a surface of the substrate, wherein the coating comprises the polyisocyanate mixture according to claim 1.

7. An article comprising two substrates bonded to one another with an adhesive disposed between the two substrates, wherein the adhesive comprises the polyisocyanate mixture according to claim 1.

8. A method comprising; (a) providing a substrate having a surface; and (b) applying a formulation comprising the polyisocyanate mixture according to claim 1 to at least a portion of the surface.

* * * * *